(12) United States Patent
Barboiu et al.

(10) Patent No.: US 9,029,492 B2
(45) Date of Patent: May 12, 2015

(54) SUPERCONDUCTING ELECTROLYTIC HYBRID MATERIAL, AND PREPARATION METHOD AND USES THEREOF

(75) Inventors: Mihail-Dumitru Barboiu, Montpellier (FR); Mathieu Michau, Ponteilla (FR)

(73) Assignee: Centre National de la Recherche Scientifique, Paris (FR)

( * ) Notice: Subject to any disclaimer, the term of this patent is extended or adjusted under 35 U.S.C. 154(b) by 975 days.

(21) Appl. No.: 12/933,621

(22) PCT Filed: Mar. 19, 2009

(86) PCT No.: PCT/FR2009/000289
§ 371 (c)(1),
(2), (4) Date: Mar. 15, 2011

(87) PCT Pub. No.: WO2009/125084
PCT Pub. Date: Oct. 15, 2009

(65) Prior Publication Data
US 2011/0159406 A1    Jun. 30, 2011

(30) Foreign Application Priority Data

Mar. 19, 2008  (FR) ..................................... 08 01509

(51) Int. Cl.
| | | |
|---|---|---|
| C08G 77/26 | (2006.01) | |
| C08G 65/333 | (2006.01) | |
| C08G 65/20 | (2006.01) | |
| C08G 65/336 | (2006.01) | |
| C08G 77/28 | (2006.01) | |
| C08J 5/22 | (2006.01) | |
| H01B 1/12 | (2006.01) | |
| H01M 8/10 | (2006.01) | |

(52) U.S. Cl.
CPC .......... *C08G 65/33351* (2013.01); *C08G 65/20* (2013.01); *C08G 65/33306* (2013.01); *C08G 65/336* (2013.01); *C08G 77/26* (2013.01); *C08G 77/28* (2013.01); *C08J 5/2256* (2013.01); *H01B 1/122* (2013.01); *H01M 8/1027* (2013.01); *H01M 8/103* (2013.01); *H01M 8/1037* (2013.01); *H01M 8/1067* (2013.01); *H01M 8/1074* (2013.01); *H01M 2300/0082* (2013.01); *Y02E 60/523* (2013.01); *C08J 2383/04* (2013.01)

(58) Field of Classification Search
None
See application file for complete search history.

(56) References Cited

U.S. PATENT DOCUMENTS

2002/0091225 A1 *  7/2002  McGrath et al. .............. 528/170
2005/0164063 A1     7/2005  Wariishi et al.

FOREIGN PATENT DOCUMENTS

| JP | 2007-234509 | * 9/2007 | ............. H01M 8/02 |
| WO | WO 2005/111114 | 11/2005 | |

OTHER PUBLICATIONS

Lindner et al., "Supported Organometallic Complexes Part XXX. Hydroformylation of 1-hexene in interphase—the Influence of Different Kinds of Inorganic—Organic Hybrid Co-Condensation Agents on the Caralytic Activity," 2001, *Jornal of Organometallic Chemistry*, pp. 165-172, vol. 641.

Michau et al., "Ion-Conduction Pathways in Self-Organised Ureidoarene-Heteropolysiloxane Hybrid Membranes," 2007, *Chemistry—A European Journal*, pp. 1776-1783, vol. 14, No. 6. http://www3.interscience.wiley.com/cgi-bin/fulltext/117865704/HTMLSTART>.

Sung et al., "Novel Thermally Stable Cross-Linked Nonlinear Optical Silica Films Prepared by a Sol-Gel Process," 1998, *Chem. Mater.* pp. 1642-1646, vol. 10.

* cited by examiner

*Primary Examiner* — Ula C Ruddock
*Assistant Examiner* — Tony Chuo
(74) *Attorney, Agent, or Firm* — Womble Carlyle Sandridge & Rice, LLP

(57) ABSTRACT

The present invention relates to a novel superconducting hybrid polymer material and to the preparation method and uses thereof, particularly for proton superexchange membranes usable as fuel cell electrolytes.

14 Claims, 7 Drawing Sheets

SUPERCONDUCTING ELECTROLYTIC HYBRID MATERIAL, AND PREPARATION METHOD AND USES THEREOF

FIELD OF THE INVENTION

The present invention relates to a novel superconducting hybrid polymer material, to its process of preparation and to its uses, in particular as proton superexchange membrane which can be used as electrolyte in fuel cells.

The invention which will be described below comes in particular within the context of the conversion and management of energy. In this day and age, the production and the consumption of energy are based predominantly on the combustion of fossil resources, which is expected to eventually have a major impact on the world economy and an unfavorable effect on the environment and the ecology of the planet (shortages of fossil fuels and increasing atmospheric pollution). This is why the conversion of energy electrochemically using fuel cells is being seriously considered as an alternative source of energy and of power (energy carrier).

BACKGROUND

Proton exchange membrane fuel cells, also known under the name of polymer electrolyte membrane fuel cells, (PEMFC) are fuel cells of a type developed for applications in transportation and also for portable applications. The principle of fuel cells was demonstrated experimentally in 1839 by the British electrochemist Sir William Grove. The first fuel cells of PEMFC type were developed in the United States from the 1960s by General Electric for space applications. Currently, cells of this type, designed to operate at intermediate temperatures (40-120° C.), have been developed internationally by the motor vehicle and portable electronics industries. However, despite undeniable environmental advantages and high energy efficiencies, fuel cells are only just beginning to compete with internal combustion engines because of costs which are still high (starting materials, lifetimes).

The core of a fuel cell of PEMFC type is composed of a polymer electrolyte membrane, of electrodes (anode and cathode, generally in the form of thin layers of platinum) and of bipolar plates used for gas diffusion.

Fuel cells operating with proton exchange polymer electrolyte membranes make it possible to convert the chemical energy of gases ($H_2/O_2$) into electrical energy with high energy efficiencies and without any discharge of pollutant, according to the following equations: Reaction at the cathode (site of the reduction of the oxygen):

$$\tfrac{1}{2}O_2 + 2H^+ + 2e^- \rightarrow H_2O$$

Reaction at the anode (site of the oxidation of the hydrogen):

$$H_2 \rightarrow 2H^+ + 2e^-$$

The two electrodes being separated by the electrolyte (membrane), the fuel to be oxidized (hydrogen) is conveyed to the anode and the cathode is fed with oxygen (or more simply with air, which may or may not be enriched in oxygen). The dihydrogen reacts at the anode and releases two electrons (oxidation) which feed an external electrical circuit connecting the anode and the cathode. Cathodic reduction of the oxygen takes place at the cathode. The reactants are in principle introduced continuously into the device and the electromotive force of the cell is equal to the difference in the electrode potentials. Thus, a universally known overall reaction is obtained:

$$H_2 + \tfrac{1}{2}O_2 \rightarrow H_2O$$

Water is thus produced by the normal operation of the cell and has to be discharged to the outside of the membrane. The management of the water is crucial for the performance of the cell; care should be taken that the amount of water remains continually at an optimum level guaranteeing that the cell operates well. In particular, an excess of water results in excessive swelling of the membrane and in blocking of the distribution channels or electrodes and has a negative effect on the access of the gases to the catalytic sites, whereas an inadequate amount of water results in draining of the membrane, which is harmful to the conductivity thereof and to the efficiency of the cell.

The role of the membrane is thus to provide for the transportation of the protons ($H^+$) from the anode to the cathode and to thus make possible the electrochemical reaction. However, the membrane must not conduct the electrons, which would create a short circuit in the fuel cell. The membrane must be resistant to the reducing environment at the anode and, at the same time, to an oxidizing environment at the cathode but must also prevent the mixing of the hydrogen present at the anode with the oxygen present at the cathode.

One of the first proton-transporting polymers which was used for the production of such membranes, and which today remains the reference in this field, is Nafion®, a perfluorosulfonic polymer developed and perfected in 1968 by the American firm Du Pont de Nemours. Historically, the Gemini space programs of NASA in the 1960s used fuel cells comprising membranes of polystyrenesulfonate type but they were very quickly supplanted by the Nafion® membranes, which made it possible to improve the performance of the PEMFCs. Chemically, it is an organic polymer composed of a flexible fluorocarbon chain on which ionic groups are randomly distributed (Mauritz K. A. et al., Chem. Rev., 2004, 104, 4535-4585). On the principle of Nafion®, there also exist other commercial perfluorosulfonic polymers, such as those sold under the trade names Aciplex® (Asahi Chemical Company, Japan) or Flemion® (Asahi Glass Company, Japan).

The membranes manufactured from these polymers are by nature very stable chemically, thermally and mechanically (flexibility). They exhibit good electrochemical properties with a high conductivity, of the order of 0.1 S·cm⁻¹ at ambient temperature and 100% relative humidity (according to the data of the manufacturer for Nafion®). However, these membranes have to operate at a temperature of less than 90° C. and always have to remain saturated with water in order to make possible effective movement of the H⁺ ions. This is because the conduction of the protons takes place mainly by a mechanism of Grotthus type, that is to say by protons hopping along the ionic and hydrophilic conduction pathways (Mauritz K. A. et al., 2004, abovementioned). Furthermore, the synthesis of these membranes is lengthy and difficult, indeed even dangerous due to the use of fluorine, which partly accounts for their very high cost price. Neither are they entirely satisfactory as regards the problems related to the management of the water and to the changes in temperature. This is because, when the system is subjected to numerous variations in the level of moisture, successive cycles of swelling and of restructuring of the membrane are noted as appearing, resulting in significant fatigue. Furthermore, Nafion® is a polymer which very naturally undergoes a glass transition (Tg=120° C.), which contributes to its accelerated aging and to the appearance of structural reorganizations and of mechanical weaknesses (splits), thus limiting its lifetime.

Other types of alternative polymers which can be used in the preparation of electrolyte membranes have also already been proposed. They are in particular sulfonated or doped heat-stable polymers (polybenzimidazoles, polyarylethersulfones, sulfonated polyaryletherketones, and the like). These polymers result in membranes also exhibiting some disadvantages, in particular in terms of conductivity (performance), of lifetime and of management of the water.

Patent application US 2005/0164063 describes the synthesis of various solid compounds and electrolytes obtained from precursors based on silsesquioxane in which a siloxane functional group is bonded to a phenylsulfonate group via a divalent group devoid of a urea functional group. Such structures, in which the divalent group connecting the siloxane functional group to the phenylsulfonate is an alkyl or aryl radical, have the disadvantage of exhibiting low conductivities (Electrochimica Acta, 2003, 48, 2181-2186).

This is why, in order to overcome the respective weaknesses of each of these systems, numerous studies on modification by incorporation of inorganic phases have been carried out in recent years, which has resulted in an overall improvement in the properties of PEMFCs. This is reflected in particular in the management of the water and in the behavior of the materials at high temperature (dehydration) and their long-term stability. These concepts have spread with the appearance of hybrid membranes, which have also made it possible to demonstrate the importance of the presence of a continuous inorganic network within the conducting electrolyte.

Rhodium-based monomeric complexes obtained by reaction of (p-aminophenyl)diphenylphosphine with (3-isocyanato-propyl)triethoxysilane, exhibiting improved catalytic properties, are also known and used for sol-gel polymerizations (J. Organomet. Chem., 2002, 641, 165-172).

Films prepared by reaction of an alkoxysilane with 4-[(4"-aminophenyl)sulfonyl]-4'-[N,N'-bis(2-hydroxy-ethyl) amino]azobenzene, by sol-gel polymerization, are also described in Chem. Mater., 1998, 10, 1642-1646, for their applications in the field of optics.

Unfortunately, at the present time, no membrane, whatever its nature, fully meets the stringent requirements of the manufacturers and users of PEMFCs. Although many operational technical devices using these electrochemical systems have appeared on the market, such as, for example, the GENEPAC fuel cell, which results from a partnership between PSA Peugeot Citroen and the Commissariat à l'Energie Atomique [French Atomic Energy Commission] and which has a power which can range up to 80 kW, there still remain technological blockades to be raised.

In terms first of all of management of the water: as was seen above, it is essential to manage the water produced during the operation of the cell and its influence on the properties of the electrolyte membrane (in particular the conductivity). This need to control and manage as best as possible the transportation of water which takes place in a PEMFC (entries, exits, generation and back-diffusion between cathode and anode) remains a very major constraint which encourages the production of electrolytes less dependent on the relative humidity.

In terms of operating temperature also: fuel cells of Nafion® type can only operate at maximum temperatures of 90° C. For higher temperatures, the membranes may no longer provide suitable conductivity of the protons because of their inability to retain the water. Their efficiency decreases as a function of the fall in the relative humidity related to the rise in the temperature. In point of fact, the application of fuel cells in transportation vehicles requires the use of membranes which can operate satisfactorily at temperatures of greater than 90° C., in particular at temperatures of between 120 and 150° C. Membranes of this type do not currently exist on the market.

In terms finally of manufacturing cost: in order to make it possible to develop this technology on a large scale and to render these power generators, destined for a bright future, widespread, the problem remains of the cost of manufacture of the electrolyte membrane as such but also the cost of manufacture of the fuel cell core (MEA) related to the use of platinum as catalyst.

SUMMARY OF THE INVENTION

The inventors thus set themselves the aim of developing a novel hybrid polymer material which makes it possible to overcome these various disadvantages and which can in particular be used as hybrid electrolyte membrane for proton conduction in fuel cells while exhibiting improved properties with respect to the existing membranes, in particular in terms of conductivity/performance, of management of water and operating temperature and in terms of thermal and chemical operating stability and of lifetime. This aim is achieved with the hybrid polymer material which will be defined hereinbelow and which constitutes, as such, the first subject matter of the present invention.

A subject matter of the present invention is consequently a hybrid polymer material, characterized in that it is provided in the form of a film and in that it results from the sol-gel polymerization by nucleophilic catalysis of at least one hybrid precursor of following formula (I):

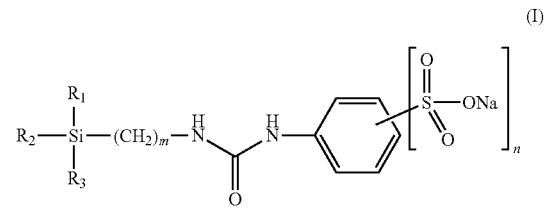

in which:
- $R_1$ and $R_3$ are identical and represent a methyloxy or ethyloxy radical;
- $R_2$ represents a methyl, ethyl, methyloxy, ethyloxy or phenyl radical;
- m is an integer varying from 2 to 6 inclusive;
- n is an integer equal to 1 or 2.

This material is provided in the form of a transparent and flexible film.

According to a preferred embodiment, said material is obtained by polymerization of at least one precursor of above formula (I) in which $R_1$ and $R_3$ represent an ethyloxy radical.

Among the designations mentioned above for the $R_2$ radical of the precursors of formula (I), the ethyloxy radical is particularly preferred.

According to a preferred embodiment of the invention, the precursors of formula (I) are chosen from the compounds in which $R_1$=$R_2$=$R_3$=ethyloxy.

Among the values given for m, it is preferable to use the precursors of formula (I) in which m=3.

In the precursors of formula (I) above, when n=1, the sodium sulfonate group preferably occupies the para position of the phenyl ring with respect to the carbon atom bonded to the nitrogen atom of the urea group. When n=2, the two sulfonate groups are preferably either each in the meta position with respect to the carbon atom bonded to the nitrogen atom of the urea group or respectively in the para and meta positions with respect to the carbon atom bonded to the nitrogen atom of the urea group.

These preferences correspond to the following configurations (1-1) to (1-3):

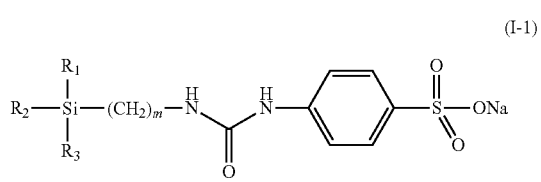

(I-1)

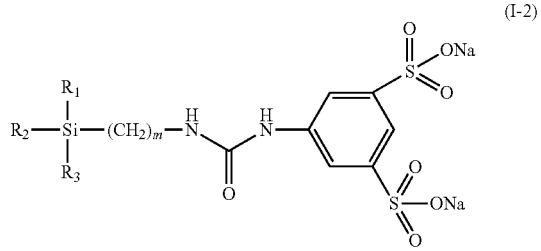

(I-2)

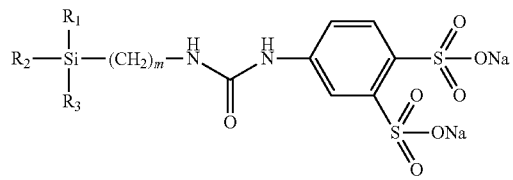

(I-3)

in which $R_1$, $R_2$, $R_3$ and m have the same meanings as those indicated above for the precursors of formula (I).

Among these precursors, the compounds in which n=1, that is to say the precursors of formula (I-1), are preferred.

Among the precursors of formula (I) above, 1-(3-(tri-ethoxysilyl)propyl)-3-(4-(sodium sulfonato)phenyl)urea is particularly preferred; this precursor corresponds to the following formula:

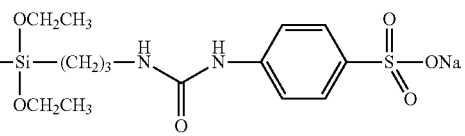

Thus, according to a particularly advantageous and preferred embodiment of the invention, the hybrid polymer material results from the sol-gel polymerization by nucleophilic catalysis of 1-(3-(tri-ethoxysilyl)propyl)-3-(4-(sodium sulfonato)phenyl)urea.

According to an alternative form of the invention, the polymerization of the precursor of formula (I) is carried out in the presence of a hybrid plasticizing precursor. In this case, the hybrid polymer material in accordance with the invention results from the sol-gel copolymerization under nucleophilic catalysis of at least one precursor of formula (I) as defined above and of at least one plasticizing precursor of following formula (II):

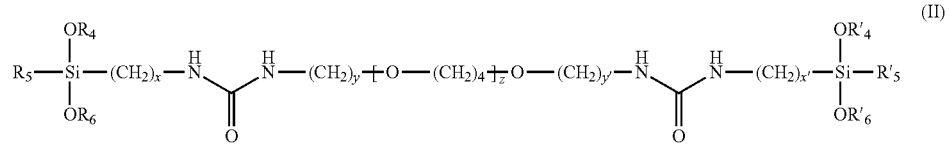

(II)

in which:
- $R_4$, $R'_4$, $R_6$ and $R'_6$ are identical and represent a methyl or ethyl radical;
- $R_5$ and $R'_5$, which are identical or different, represent a methyl, ethyl, methyloxy, ethyloxy or phenyl radical;
- x and x', and y and y', which are identical or different, are integers varying from 2 to 6 inclusive;
- z is an integer varying from 8 to 16 inclusive.

According to a preferred embodiment of the invention, the precursors of formula (II) are chosen from the compounds in which $R_4$, $R'_4$, $R_6$ and $R'_6$ represent an ethyl radical.

According to another preferred embodiment of the invention, the precursors of formula (II) are chosen from the compounds in which the $R_5$ and $R'_5$ radicals represent an ethyloxy radical.

Among the values given for x, x', y and y', preference is given to the plasticizing precursors of formula (II) in which x=x'=y=y'=3.

In the plasticizing precursors of formula (II), z is preferably an integer varying from 12 to 14 inclusive, the value z=13 being very particularly preferred.

According to a very particularly preferred embodiment, the plasticizing precursors are chosen from the compounds of formula (II) which are symmetrical with respect to the central polytetrahydrofuran unit.

Mention may in particular be made, as plasticizing precursor of formula (II) above, of bis(3-(triethoxy-silyl)propylurea)-3-poly(tetrahydrofuran) in which the number (z) of tetrahydrofuran units=13. This compound corresponds to the following formula:

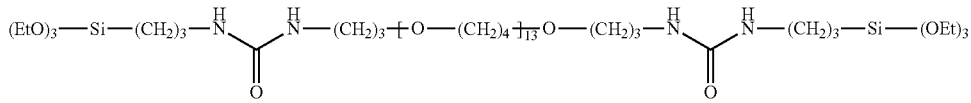

The presence of at least one plasticizing precursor of formula (II) as defined above makes it possible to increase the flexibility, the elasticity and the hydrophobicity of the hybrid polymer material in accordance with the invention.

Within the hybrid polymer material according to the invention, and when it is used, the plasticizing precursor preferably represents from 10 to 40 mol % approximately, more particularly from 15 to 25 mol % approximately, with respect to the number of moles of precursor of formula (I).

According to a preferred embodiment of the invention, the hybrid polymer material exhibits a thickness of between 100 and 200 μm inclusive.

Another subject matter of the present invention is the process for the preparation of the hybrid polymer material which is provided in the form of a film and which is as defined above, characterized in that it comprises the following stages:
1) the dissolution, in an anhydrous solvent, of at least one hybrid precursor of following formula (I):

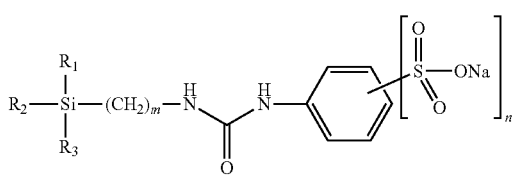

in which:
- $R_1$ and $R_3$ are identical and represent a methyloxy or ethyloxy radical;
- $R_2$ represents a methyl, ethyl, methyloxy, ethyloxy or phenyl radical;
- m is an integer varying from 2 to 6 inclusive;
- n is an integer equal to 1 or 2, 2) the sol-gel polymerization of said hybrid precursor of formula (I) by addition of a nucleophilic catalyst chosen from primary amines and imidazole derivatives, in the presence of water, in order to obtain a gel,
3) the shaping of said gel,
4) the drying of said gel, in order to obtain a solid material in the form of a film,
5) $Na^+/H^+$ ion exchange by immersion of said film in an acid solution and
6) the rinsing of said film with water in order to remove any trace of acid.

The anhydrous solvent used during stage 1) can, for example, be chosen from methanol, dimethylformamide (DMF) and dimethylacetamide.

The hybrid precursors of formula (I) employed during stage 1) are not commercial products. They can be prepared according to a synthesis process comprising the following stages:

i) the complete dehydration of an aminobenzenesulfonate of following formula (III):

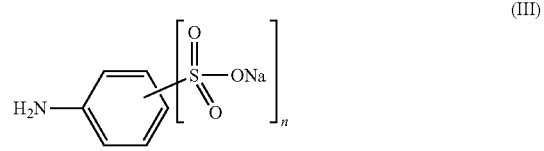

in which n is an integer equal to 1 or 2, in order to obtain an anhydrous aminobenzenesulfonate of formula (III),
ii) the dissolution of the anhydrous aminobenzenesulfonate of formula (III) obtained above in the preceding stage in an anhydrous organic solvent chosen from methanol, DMF, N,N-dimethylacetamide and their mixtures, anhydrous methanol being particularly preferred;
iii) the placing of said solution under vacuum and under an inert atmosphere;
iv) the addition to said solution, in excess and at ambient temperature, of an anhydrous isocyanate compound of following formula (IV):

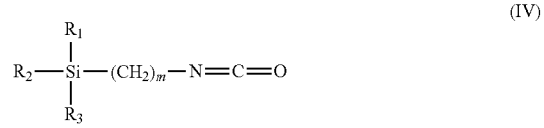

in which:
- $R_1$, $R_2$, $R_3$ and m have the same meanings as those indicated above for the hybrid precursors of formula (I);
v) the precipitation from an aprotic solvent of the expected precursor of formula (I); and vi) the washing of said precursor of formula (I) in an aprotic solvent.

The stage i) of dehydration of the aminobenzenesulfonate of formula (III) can, for example, be carried out according to the following protocol: three successive cycles at 150° C. on a drying balance, and one hour in a bell jar under vacuum at 60° C.

During stage iv), the isocyanate compound of formula (IV) is preferably used in an excess representing from 1.2 to 1.3 equivalents with respect to the amount of aminobenzenesulfonate of formula (III) employed.

According to a preferred embodiment of the invention, on conclusion of stage iv), the solution comprising the aminobenzenesulfonate of formula (III) and the isocyanate compound of formula (IV) is brought to a temperature of between 60 and 80° C. inclusive for a period of time preferably ranging from 3 to 12 hours approximately, so as to increase the reaction yield.

The aprotic solvent used during stages v) and vi) is preferably chosen from acetonitrile, ether, acetone and their mixtures. The use of an acetonitrile/ether (50/50:v/v) mixture is particularly advantageous as such.

After the washing stage, the hybrid precursor of formula (I) thus obtained can be dried and stored in a desiccator, according to conventional methods (glove box under an inert atmosphere, $P_2O_5$ dehydrating agent, silica gel, and the like), or else can be used directly in the preparation of the hybrid polymer material in accordance with the invention.

According to a preferred embodiment of the process for the preparation of the hybrid polymer material in accordance with the invention, the solution of the hybrid precursor or precursors of formula (I) of stage 1) additionally includes at least one plasticizing precursor of following formula (II):

According to a very particularly preferred embodiment, the plasticizing precursors are chosen from the compounds of formula (II) which are symmetrical with respect to the central polytetrahydrofuran unit.

Mention may in particular be made, as plasticizing precursor of formula (II) above, of bis(3-(triethoxy-silyl)propylurea)-3-poly(tetrahydrofuran) in which the number (z) of tetrahydrofuran units=13.

When a plasticizing precursor of formula (II) is used, the latter preferably represents from 10 to 40 mol % approximately, more particularly from 15 to 25 mol % approximately, with respect to the number of moles of compound of formula (I).

Among the nucleophilic catalysts which can be used during stage 2) of the process for the preparation of the hybrid polymer material in accordance with the invention, benzylamine (primary amine) is particularly preferred. During this stage, a gel is formed, the viscosity of which increases during the progress of the polymerization reaction.

The amount of nucleophilic catalyst used during stage 2) preferably varies from 2 to 3 equivalents with respect to the total number of silicon which are present in the reaction medium, the amount of water being, for its part, between 4 and 6 equivalents with respect to the total silicon number.

Stage 2) is preferably carried out at ambient temperature.

According to a preferred embodiment of this process, the shaping of said gel during stage 3) is carried out so that its thickness is between 100 and 200 μm approximately inclusive. This makes it possible, when the polymer film is subsequently used as electrolyte in a fuel cell, to enhance the performance of the system in operation (lower inherent resistance).

(II)

$$R_5-\underset{\underset{OR_6}{|}}{\overset{\overset{OR_4}{|}}{Si}}-(CH_2)_x-\overset{H}{N}\underset{O}{\overset{}{\diagup}}\overset{H}{N}-(CH_2)_{y'}\!\!-\!\!\!\left[\!O-(CH_2)_4\!\right]_{\!\!z}\!\!\!O-(CH_2)_{y'}-\overset{H}{N}\underset{O}{\overset{}{\diagup}}\overset{H}{N}-(CH_2)_{x'}-\underset{\underset{OR'_6}{|}}{\overset{\overset{OR'_4}{|}}{Si}}-R'_5$$

in which:
  $R_4$, $R'_4$, $R_6$ and $R'_6$ are identical and represent a methyl or ethyl radical;
  $R_5$ and $R'_5$, which are identical or different, represent a methyl, ethyl, methyloxy, ethyloxy or phenyl radical;
  x and x', and y and y', which are identical or different, are integers varying from 2 to 6 inclusive;
  z is an integer varying from 8 to 16 inclusive.

According to a preferred embodiment of the invention, the plasticizing precursor is chosen from the compounds of formula (II) above in which $R_4=R'_4=R_6=R'_6=$ethyl.

Among the radicals mentioned above for $R_5$ and $R'_5$, the ethyloxy radical is particularly preferred.

Among the values given for x, x', y and y', preference is given to the plasticizing precursors of formula (II) in which x=x'=y=y'=3.

According to the invention, z is preferably an integer varying from 12 to 14 inclusive, the value z=13 being very particularly preferred.

If desired, on completion of stage 4), the polymer film can be dried and stored in the desiccator. In this case, the polymer film should be gradually rehydrated, for example by successive immersions in an aqueous/alcoholic medium, such as, for example, an ethanol/water mixture, before being subjected to stages 5) of ion exchange and 6) of rinsing which are necessary for its operation and thus for its use.

The ion exchange of stage 5) is preferably carried out by immersion of the polymer film in a hydrochloric acid solution with a molarity of between 1 and 4M inclusive.

The hybrid polymer material in accordance with the invention exhibits the following advantages:
  it is easy to prepare according to an inexpensive synthesis process. It can easily be produced in a large amount without any cumbersome equipment and does not require specific safety conditions. Furthermore, there exist numerous possibilities for shaping the gel: casting (tape casting, spin coating), hot pressing, extruding, and the like. Furthermore, the strategy of synthesis by supramolecular self-assembling and sol-gel polymerization by nucleophilic catalysis (as described above) results in the production of highly organized and crystalline membrane films, it exhibits excellent properties of conductivity, 4 to 8 times greater than those of Nafion®-based polymer materials, which normally constitute the membranes conventionally used in the manufacture of the core of fuel cells. This consequently makes it a material of choice for use as proton-conducting polymer electrolyte membrane in fuel cells of PEMFC type, it also exhibits noteworthy properties of homogeneity, of chemical stability and of thermal stability due to a controlled nanostructuring during its synthesis and to the continuous presence of a silica inorganic backbone/matrix (Si—O—Si). The decomposition temperatures of these membranes are greater than 330° C. and they also exhibit good stabilities in a hydrolytic and/or oxidizing environment, it exhibits an exquisite architecture in the form of hydrophilic ion channels with nanometric dimensions within an inorganic silica matrix. This particular architecture is favorable to the retention of water but also to the transportation of protons. This can be advantageous in terms of management of the water by thus increasing its ability to retain water at high temperature (slower draining than other electrolytes).

Another subject matter of the invention is thus:

the use of at least one hybrid polymer material as defined above as proton-conducting polymer electrolyte membrane in a fuel cell, and a fuel cell, characterized in that it comprises, as electrolyte, at least one proton-conducting polymer membrane composed of a hybrid polymer material as defined above.

When it is used as electrolyte membrane in a fuel cell, the hybrid polymer material in accordance with the invention is generally either inserted between two platinum electrodes (for example of the type resulting from platinized carbon) or directly covered with platinum nanoparticles.

For this application, the use of a hybrid polymer material resulting from the sol-gel copolymerization under nucleophilic catalysis of 1-(3-(triethoxy-silyl)propyl)-3-(4-(sodium sulfonato)phenyl)urea and of at least one plasticizing precursor of formula (II) as defined above is particularly preferred. In this case, the plasticizing precursor of formula (II) is preferably bis(3-(triethoxysilyl)propylurea)-3-poly(tetrahydrofuran) in which the number (z) of tetrahydrofuran units=13.

DESCRIPTION OF THE FIGURES

In addition to the preceding provisions, the invention also comprises other provisions which will emerge from the description which will follow, which refers to an example of the preparation of a hybrid precursor of formula (I), to an example of the preparation of a polymer electrolyte material based on a hybrid precursor of formula (I), and to the appended FIGS. 1 to 8, in which:

FIG. 4B: magnification×240 000, showing the submicron organization of the precursor (1) at nanometric scales;

Figure 13:
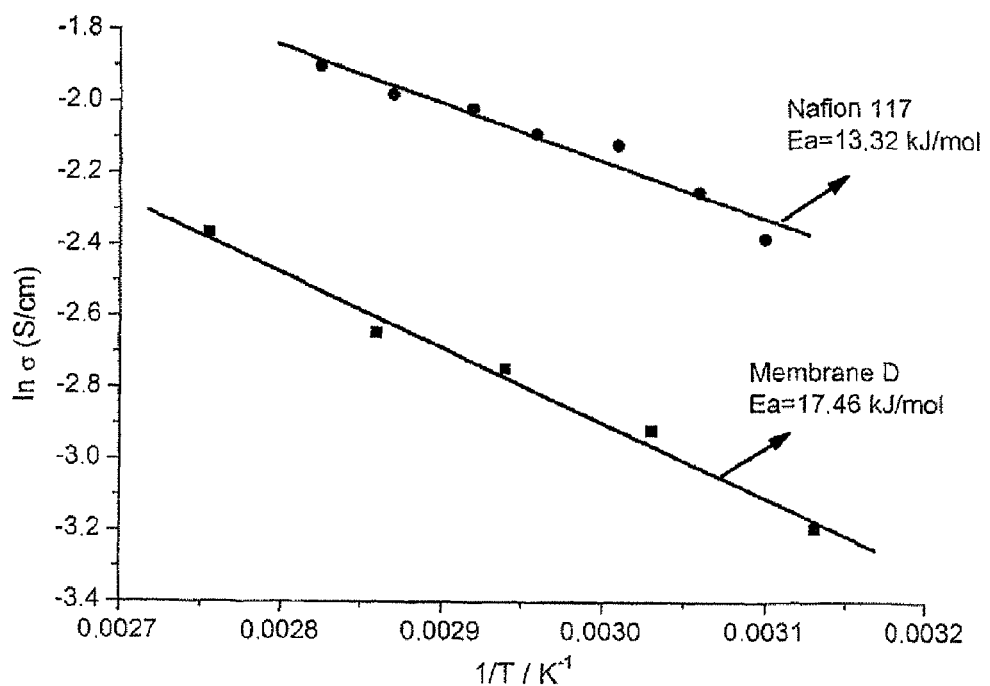

a) cross section of a hybrid membrane according to the invention, b) diagrammatic assemblage of the lamellar nanodomains, c) formation of proton-conduction channel bonds comprising the conducting groups —$SO_3H$—$H_2O$;

FIG. 13 represents the Arrhenius curve of the membranes in immersion measured by electrochemical impedance spectrometry.

DETAILED DESCRIPTION OF THE INVENTION

However, it should be understood that these examples are given only by way purely of illustration of the invention, of which they do not in any way constitute any limitation.

Example 1

Preparation of 1-(3-(triethoxysilyl)propyl)-3-(4-(sodium sulfonato)phenyl)urea (Precursor (1))

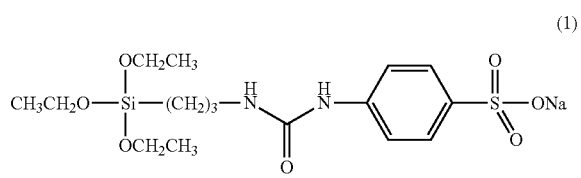

(1)

In a first step, commercial sodium 4-aminobenzenesulfonate dihydrate (2) was dehydrated according to the following protocol: three successive cycles at 150° C. on a drying balance, followed by one hour in a bell jar under vacuum at 60° C., where the dehydrated product was stored until it was used. Subsequently, 1 g of sodium 4-aminobenzenesulfonate thus dehydrated (6.67 mmol; 1 eq.) was introduced into a round-bottomed flask containing 30 ml of anhydrous methanol. The solution was stirred, subjected to ultrasound and placed under vacuum and then under an inert atmosphere ($N_2$). 1.65 g of anhydrous 3-triethoxysilylpropyl isocyanate (5.13 mmol; 1.3 eq.) were then added dropwise to this solution with continuous stirring and then the combined product was brought to reflux at a temperature of 80° C. for 5 hours. At the end of the reaction, the colorless solution obtained was concentrated under vacuum and then subjected to precipitation and crystallization by slow cooling to a temperature of 4° C. in an acetonitrile/ether (50/50:v/v) mixture. The mixture was subsequently very rapidly filtered and the filter residue was washed several times with acetonitrile/toluene (75/25:v/v) mixtures to give a white paste which was immediately dried at 60° C. under an evacuated bell jar and then stored in a desiccator. This example made it possible to obtain the pure precursor (1) with a yield of greater than 90% in the form of a white hygroscopic powder.

$^1$H NMR (300 MHz, $d_6$-DMSO): δ (ppm)=0.55 (t, J=8.1 Hz, 2H); 1.14 (t, J=6.3 Hz, 9H); 1.47 (m, J=8.35 Hz, 2H); 3.04 (q, J=7.5 Hz, 2H); 3.74 (q, J=8.1 Hz, 6H); 6.36 (t, J=5.4 Hz, 1H); 7.34 (d, J=6.2 Hz, 2H); 7.46 (d, J=6.4 Hz, 2H); 8.61 (s, 1H).

$^{13}$C NMR (75 MHz, $CDCl_3$): δ (ppm)=7.4; 18.3; 23.5; 39.6; 57.5; 116.2; 126.5; 140.1; 141.5; 153.8.

A structural analysis by powder X-ray diffraction of the precursor (1) thus obtained was carried out using a Philips brand diffractometer, PanAnalytical X'pert Pro I model (measurements in Bragg-Brentano mode, secondary graphite monochromator, X'celerator detector, Cu radiation). The diffractogram obtained is represented in the appended FIG. 1, in which the intensity (in arbitrary units) is a function of the diffraction angle (2θ), the crystallographic structure of the precursor (1) being, for its part, represented in the appended FIG. 2.

These results make it possible to demonstrate that this precursor is highly crystalline. These results show that the precursor (1) crystallizes according to a monoclinic unit cell, P2 l/c space group, having a mean volume of 2194.79 $Å^3$ and the following unit cell parameters: α=γ=90'; β=116.4°; a=19.499 Å; b=5.014 Å and c=22.449 Å.

Figure 1:
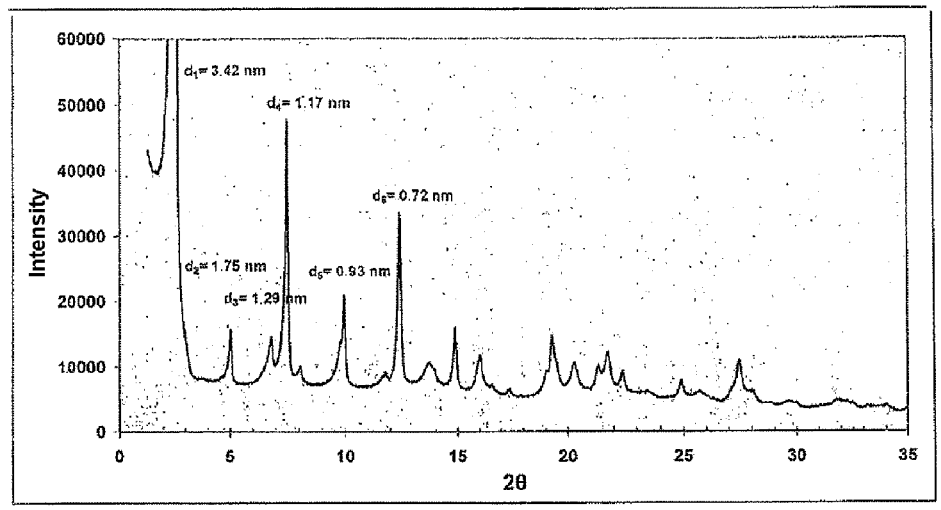
FIG. 1 represents the X-ray powder diffractogram of the precursor 1-(3-(triethoxysilyl)propyl)-3-(4-(sodium sulfonato)phenyl)urea (1) (intensity in arbitrary units as a function of the diffraction angle (2θ))
Figure 2:
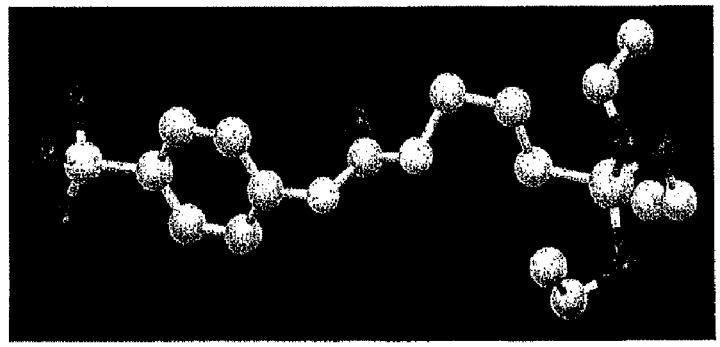
FIG. 2 represents the crystallographic structure of the precursor (1)
Figure 3:
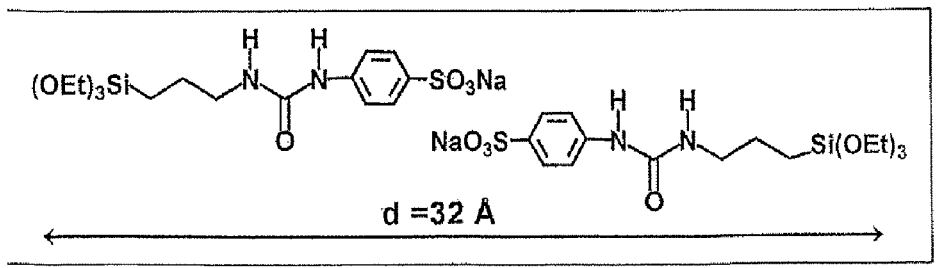
FIG. 3 is a diagrammatic representation of the molecular organization of the precursor (1) in the form of a dimer $(1)_2$.

The diffractogram of the precursor (1) as represented in FIG. 1 exhibits a very intense small-angle peak corresponding to an interplanar distance of 3.42 nm and certainly to the formation of dimers $(1)_2$ at the molecular level, as is represented diagrammatically in the appended FIG. 3. Specifically, it can be considered that this distance corresponds to the face-to-face arrangement of neighboring molecules, the sulfonate functional groups of which occur close to one another. Furthermore, the self-assembling via hydrogen bonds of the urea groups makes it possible to obtain a parallel layout of the molecular structure of the precursors (1) (oriented isotopic superstructures).

Figure 4:
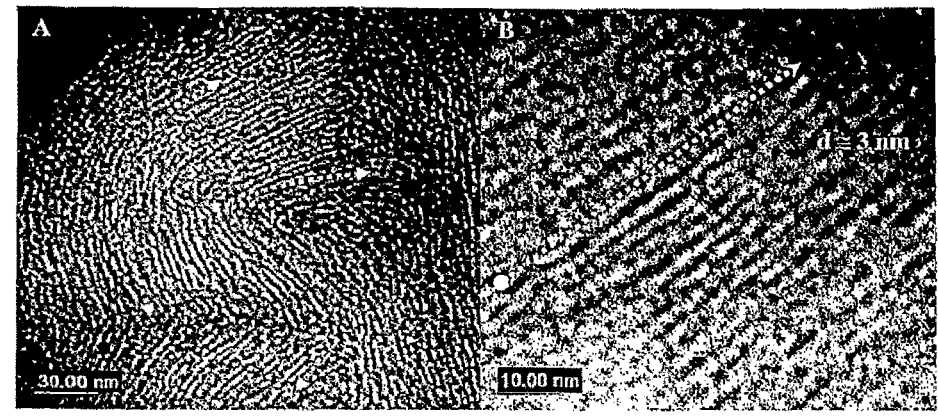
FIG. 4 represents a transmission electron microscopy photograph (FIG. 4A: magnification×80 000.

Transmission electron microscopy analyses have made it possible to observe very high organization at the submicron level (see appended FIG. 4). Specifically, these negatives with regard to the organization of the precursor (1) at nanometric scales (FIGS. 4A and 4B) demonstrate the formation of continuous molecular channels positioned in parallel with respect to one another.

Example 2

Preparation of Hybrid Electrolyte Materials Based on 1-(3-(triethoxysilyl)propyl)-3-(4-(sodium sulfonato)phenyl)urea and on a Plasticizing Hybrid Precursor 1) Preliminary Stage: Synthesis of a Plasticizing Hybrid Precursor: bis(3-(triethoxysilyl)propylurea)-3-poly(tetrahydrofuran) (3)

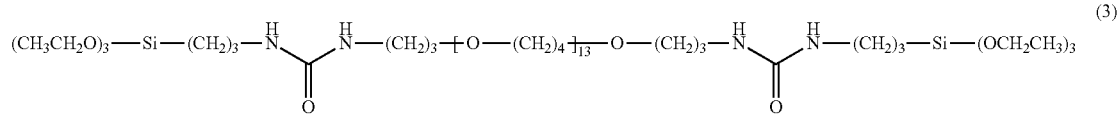

(3)

2 g (1 eq.; 1.82 mmol) of poly(tetrahydrofuran)-bis(3-aminopropyl), sold by Aldrich (reference 436577; $M_n$=1100, i.e. 13 tetrahydrofuran units), were dissolved in 30 ml of an anhydrous chloroform solution. The solution was stirred, subjected to ultrasound and placed under vacuum and then under an inert atmosphere (N₂). 0.94 g (2.1 eq.; 3.8 mmol) of 3-triethoxysilylpropyl isocyanate was subsequently added dropwise to this solution with continuous stirring and then the combined mixture was brought to reflux at 80° C. for 20 hours. The reaction mixture was then evaporated under vacuum for 4 hours at a temperature of 80° C., to give a translucent viscous solution. The latter was washed several times with 3×20 ml of an acetonitrile/ether (50/50:v/v) mixture and the expected plasticizing hybrid precursor (3) was recovered in the form of a viscous gel after centrifuging and separating by settling.

$^1$H NMR (300 MHz, d$_6$-DMSO): δ (ppm)=0.51 (t, J=9.2 Hz); 1.11 (t, J=6.2 Hz); 1.36 (m); 1.50 (m); 1.59 (m); 2.95 (q, J=6.1 Hz); 3.02 (q, J=6.3 Hz); 3.15 (s); 4.42 (s); 3.32 (s); 3.74 (q, J=9.4 Hz); 5.73 (t, J=5.6 Hz); 5.81 (t, J=5.3 Hz).

2) Syntheses of Polymer Electrolyte Membranes

The hybrid polymer materials were synthesized according to a sol-gel polymerization process with nucleophilic catalysis using benzylamine as catalyst. The reaction medium is formed of the precursor (1) prepared above in example 1 as functional hybrid precursor of formula (I) and the precursor (3) as prepared above in the preliminary stage as plasticizing hybrid precursor of formula (II).

The precursor (1) contributes the functionality (conduction) to the system and the precursor (3) makes it possible to adjust the physical properties of the material (flexibility).

To do this, the precursor (1) was dissolved in 5 ml of an anhydrous methanol solution and then the precursor (3) was added dropwise with vigorous stirring. The amounts of each of the precursors used to prepare the hybrid polymer materials A to G below are presented in table 1 below:

TABLE 1

| Material | Composition of the membrane | | |
|---|---|---|---|
| | % by weight of precursor (1) | % by weight of precursor (3) | Mol % of precursor (1) |
| A (*) | 0 | 100 | 0 |
| B | 20 | 80 | 47.4 |
| C | 30 | 70 | 60.8 |
| D | 40 | 60 | 64.3 |
| E | 48 | 52 | 70.6 |
| F | 58 | 42 | 78.3 |
| G | 78 | 22 | 84.2 |
| H | 100 | 0 | 100 |

(*): Material not forming part of the present invention

Each of the solutions was subsequently homogenized by subjecting to ultrasound and then stirring for 30 min. 3 eq. of benzylamine (corresponding amount calculated with respect to the total number of triethoxysilane groups present in the medium: total n Si(OEt)$_3$=1 eq.) and water (6 eq.) were subsequently added in order to initiate the hydrolysis reactions. The combined mixture was vigorously stirred for 45 min. In the end, the viscosity gradually increased to result in a viscous gel.

A membrane I comprising 35% by weight of compound (1) was also prepared.

3) Shaping of the Polymer Materials

Each of the gels thus obtained was subsequently poured into a circular Petri dish made of Teflon®, dried at ambient temperature for 24 hours and then dried in an oven according to the following heat cycle: 8 hours at 40° C., 4 hours at 60° C., 4 hours at 80° C., 2 hours at 100° C. and 1 hour at 120° C. Once dried, the hybrid polymer materials were removed from the mold, then cooled and gradually rehydrated in an ethanol/water (95/5:v/v) mixture. An Na⁺/H⁺ ion exchange was subsequently carried out by immersing the materials in a 1M hydrochloric acid solution for 24 hours, by then immersing them several times in baths of deionized water (3 times for 24 hours) and by rinsing them so as to remove any excess acid until a neutral and unchanging pH (approximately 7) is obtained for the rinsing solution.

4) Results

The electrochemical and thermal properties of the materials A to G thus obtained appear below in table 2, in which those of a polymer material of Nafion® 117 type with a thickness of 175 μm have also been mentioned by way of comparison. The following were thus measured:
1) Ion Exchange Capacity (IEC):

the IEC is a characteristic measurement, for a given material, which defines the ion-exchange potential with respect to the weight. It thus represents the number of equivalents of ion-exchanging sites present in a predetermined amount of material. It is generally expressed in milli-equivalents of ions per gram (meq/g) of dry material in the acid form (in this example, the counterion is then a proton H⁺). It was determined for all the materials by conventional acid/base titrations. Experimentally, each of the electrolyte materials (ion exchangers) was equilibrated in the acid (H⁺) form in a 1 molar sodium chloride (NaCl) solution for 24 hours; there was then release of the protons and replacement by Na⁺ cations. It was then possible to quantitatively determine the solution comprising the protons with a basic solution of sodium hydroxide (NaOH) type. By using a pH meter and a suitable colored indicator (such as, for example, phenol red), it was possible to precisely determine the equivalence. The IEC is expressed by the following equation:

$$IEC(meq/g) = 1000 \times \frac{C_{NaOH} \times V_{eq}}{W}$$

in which $C_{NaOH}$ is the concentration of the basic sodium hydroxide solution (in mol/l), V (in l) represents the volume of sodium hydroxide necessary to produce the equivalence and W represents the weight (in g) of the dry material.

In the end, this made it possible to characterize the accessibility to the ion-exchanging sites and their true number (with respect to a theoretical value);
2) Degree of Swelling of the Electrolyte Material:

it is expressed as percentage and corresponds to an expansion by volume when it is equilibrated in an aqueous solution (indeed even an organic solution). Thus, the ion-exchanging sites and the counterions can be solvated, while the free spaces resulting from the crosslinking and from the agglomeration of the polymer chains can be filled with solvent. The degree of swelling, expressed as percentage, is defined by the ratio of the weight of solvent present inside the material to the dry weight of the latter. The degree of swelling is calculated by the following equation:

$$Ds(\%) = \frac{w_{wet} - w_{dry}}{w_{dry}} \times 100$$

in which $w_{wet}$ is the weight (in g) of the material after swelling in the solvent and $w_{dry}$ is the weight (in g) of the material before swelling in the solvent.

Experimentally, the degree of swelling was determined by measurement of the water uptake/loss. For this, the material was weighed in the dry state, then after immersing in deionized water for 24 hours and wiping the faces, and finally after drying the material in an oven at 100° C. for 24 hours, in order to determine the amount of adsorbed water. This measurement can also be carried out by using a drying balance (Mettler or Sartorius brand, and the like) and by measuring the variations in weight between the material in the hydrated or dry state.

3) Decomposition Temperature:

it was determined graphically on thermograms of the materials produced by thermogravimetric analysis (TGA) and differential thermal analysis (DTA). The measurements were carried out under nitrogen ($N_2$), with a heating temperature of 10° C./min, with devices sold by TA Instruments under the references High Resolution TGA 2950 and SDT 2960 Simultaneous.

4) Conductivity:

it was determined by impedance spectroscopy. It concerns a generalization of Ohm's law by measurement of the complex impedance Z as a function of the frequency ($\omega$) of the material subjected to a sinusoidal disturbance (input voltage), which makes it possible to access its electrical resistance R according to the following equation:

$$Z(\omega) = \frac{U(\omega)}{I(\omega)} = |Z|\exp^{(-j\phi)} = Z'(\omega) + jZ''(\omega) = \text{Re}(Z) + \text{Im}(Z)$$

chemical properties of the electrolyte, use was made, as electrodes, of two liquid mercury phases with direct contact which are present in a Teflon cell comprising two compartments between which the material was maintained. Platinum wires immersed in the mercury were connected to the measurement devices. The mercury was replaced for each measurement and it made it possible in particular to obtain very good contacts and to optimize the interface between the two electrodes and each of the materials studied.

Graphic representations were obtained corresponding to Nyquist diagrams (representation of impedance in an orthonormed reference point). These impedance diagrams (not represented) describe, in the frequency range studied, the change in the opposite of the imaginary part of the impedance as a function of the value of the real part. The real part Z' of the impedance (on the abscissa) and the opposite of the imaginary part $-Z''$ (on the ordinate) were expressed in ohms ($\Omega$). Thus, the value of the overall inherent resistance of the sample R ($\Omega$) was determined graphically, which corresponds to the extrapolation or the intersection of the curve with the axis of the abscissae. By correlating the latter with the geometrical factors of the material, namely the thickness (t) and the surface area exposed (S), it was possible to calculate the overall conductivity, expressed in $S \cdot cm^{-1}$, according to the following equation:

$$\sigma(S \cdot cm^{-1}) = \frac{t(cm)}{R(\Omega) \times S(cm^2)}$$

The experimental characterizations and measurements on the materials A to G in accordance with the invention and on the commercial membrane of Nafion® 117 type were carried out under the same conditions, with the same apparatuses and procedures (including the hydration, ion exchange in the presence of acid, and rinsing stages).

The results obtained appear in table 2 below:

TABLE 2

| Membrane | Thickness (µm) | $C_1$ (% by wt.) | $r_1$ (%) | IEC (meq/g) | Degree of swelling (%) | Hydration number $\lambda$ | Decomposition temperature (° C.) | Conductivity $\sigma$ (mS · cm$^{-1}$) |
|---|---|---|---|---|---|---|---|---|
| A (*) | 255 | 0 | 0 | 0 | 6 | 0 | 373 | 0.002 |
| B | 212 | 20 | 47.4 | 0.44 | 18 | 22 | 392 | 4.7 |
| C | 239 | 30 | 60.8 | 0.74 | 33 | 24 | 386 | 15.7 |
| D | 187 | 40 | 64.3 | 0.88 | 44 | 28 | 388 | 32 |
| E | 115 | 48 | 70.6 | 0.97 | 52 | 29 | 334 | 48.4 |
| F | 211 | 58 | 78.3 | 1.26 | 61 | 27 | 356 | 98.5 |
| G | 164 | 78 | 84.2 | 1.46 | 68 | 26 | 376 | 160.2 |
| H | — | 100 | 100 | — | — | — | — | — |
| Nafion ® 117 | 175 | — | — | 0.85 | 25 | 16 | 395 | 22.4 |

(*) Material not forming part of the invention

The measurements were carried out at a temperature of 25° C. and at 100% relative humidity (RH) with impedance meters of Solartron® 1260 (analyzer) and 1255 (interface) type using Zplot® and Zview® software. The frequency range scanned is variable and generally between 0.1 Hz and 10 MHz. The amplitude of the sinusoidal voltage signal was varied between 1 and 1000 mV, a linearity range commonly accepted for ion conductors. For the study of the electro- The values $C_1$, $r_1$ and $\lambda$ in table 2 represent:

$C_1$ is the concentration of compound (1) and it is calculated by virtue of the relationship: $C_2$ (% by weight)=100−$C_1$, $r_1$ is the molar ratio of the compound (1), and $\lambda$ is the hydration number: $\lambda=(n_{H_2O}/n_{SO_3H})$.

The reference membrane A obtained from the compound (3) exhibits a zero ion exchange capacity (IEC) and a very low proton conductivity which can be attributed to the inorganic silica network and to the absence of functional groups.

The results presented in table 2 above also show that the material D comprising only 40% by weight of precursor (1) exhibits, for a degree of swelling which is 1.75 times greater, a decomposition temperature and an ion exchange capacity which are equivalent to and a conductivity which is greater (×1.45) than that of the reference membrane of Nafion® 117 type. The materials F and G having a composition which is higher in precursor (1), respectively 58 and 78% by weight, for their part exhibit slight differences in terms of swelling and of resistance to heat but, on the other hand, exhibit much greater ion exchange capacities than the reference membrane of Nafion® 117 type and, which is the most advantageous, conductivities which are 4 to 8 times greater than that of the reference membrane of Nafion® 117 type.

Structural analyses by X-ray diffraction of the materials A, D and H thus obtained were subsequently carried out using a diffractometer sold by Philips, PanAnalytical X'pert Pro I model (measurements in Bragg-Brentano mode, secondary graphite monochromator, X'celerator detector, Cu radiation). These analyses demonstrate significant organization of the hybrid polymer materials.

Figure 5:
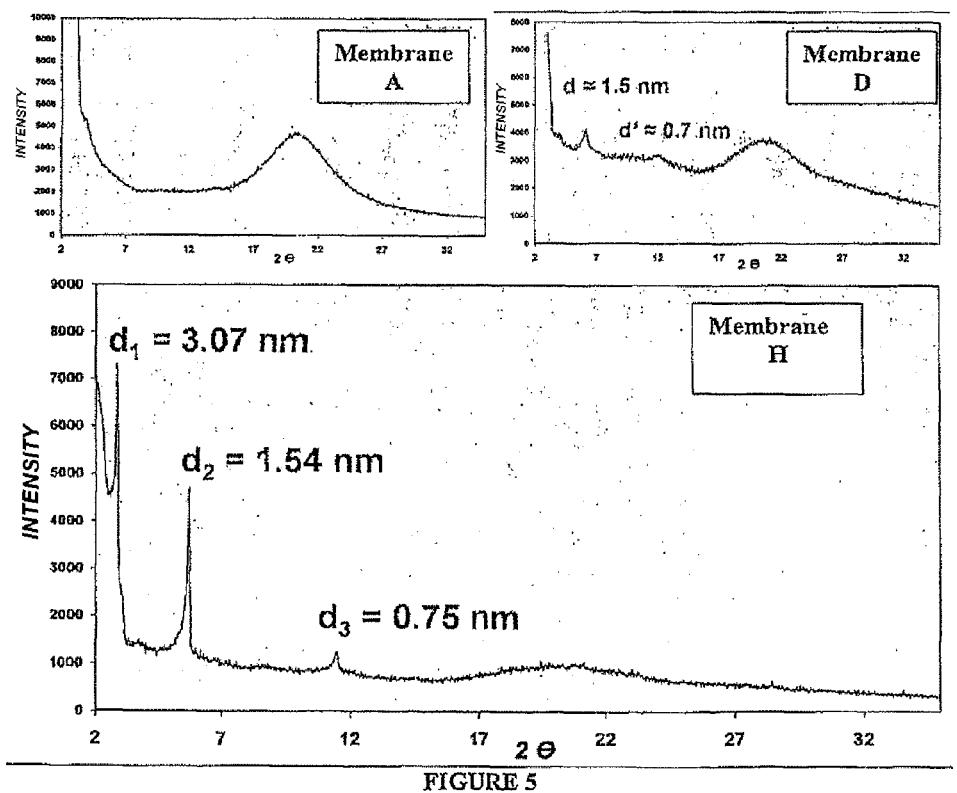
FIG. 5 represents the X-ray diffractograms of hybrid materials obtained with the precursor (1), in the presence or absence of a plasticizing precursor (compound 3), in comparison with a material not forming part of the invention obtained not using precursor (1) but only the plasticizing precursor (3): Material A, obtained with solely the compound (3), Material D, obtained with 40% by weight of precursor (1) and 60% by weight of precursor (3), and Material H, obtained using only the precursor (1) without plasticizing precursor (3). In this figure, the intensity (in arbitrary units) is a function of the diffraction angle (2θ)

The diffractograms of the materials A, D and H are represented in the appended FIG. 5, in which diffractograms the intensity, in arbitrary units, is expressed as a function of the diffraction angle 2θ.

Figure 6:
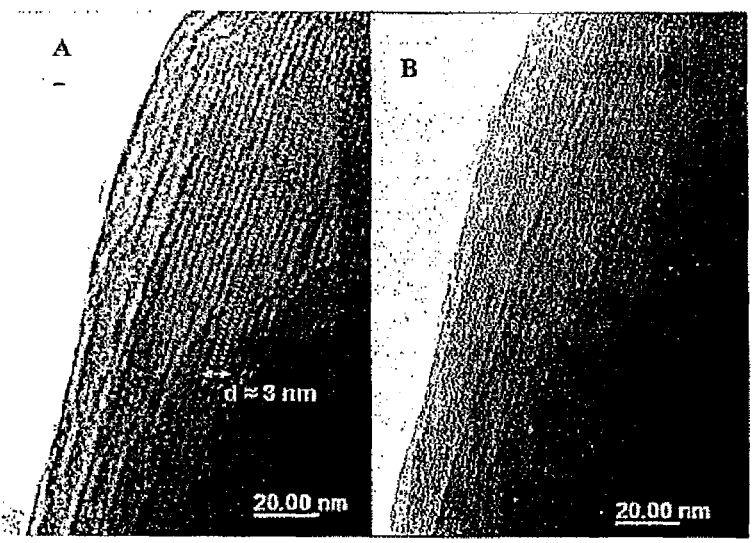
FIG. 6 is a transmission electron microscopy photograph of a hybrid polymer material 100% composed of the precursor (1) polymerized by the sol-gel method (membrane H of table 2 of example 2 below) at a magnification×120 000 (FIG. 6A: image in underfocus, FIG. 6B: image at focusing)

It is observed first of all that, in the absence of precursor (1) (hybrid precursor of formula (I)) (material A not forming part of the invention), the material obtained does not exhibit any diffraction peak and it is thus amorphous. It is also noticed that, when the content by weight of precursor (1) is increased, diffraction peaks emerge from the diffractogram (materials D and H): this is expressed by very intense discrete peaks, the main one of which (plane of 001 type) is situated at the small angles and corresponds to an interplanar distance centered on 3 nm. The other two peaks, which are less intense, are harmonic peaks directly related to the first and correspond to the plane of 002 type and of 004 type, which demonstrates the presence of a lamellar network organized into molecular channels with a mean width of 3 nm. In this regard, the appended FIG. 6 represents a transmission electron microscopy photograph of the material H at a magnification×120 000 (FIG. 6A: image in underfocus, FIG. 6B: image at focusing). This figure demonstrates the structuring as parallel nanometric (3 nm) channels within the material H.

Thus, the high crystallinity of the starting precursor (1) is transferred within the hybrid network with the formation of highly structured materials. In the hybrid network, the precursors (1) are reencountered polymerized and rigid (formation of the inorganic backbone/matrix via bonds of Si—O—Si type), the sulfonic functional groups of which are directed towards the inside of the channel. The pairing of the close neighbors generates an entirely condensed final architecture in which the nanometric and parallel channels make it possible to define a preferred space for the transportation of the ionic entities and particularly for the conduction of the protons ($H^+$).

Figure 7:
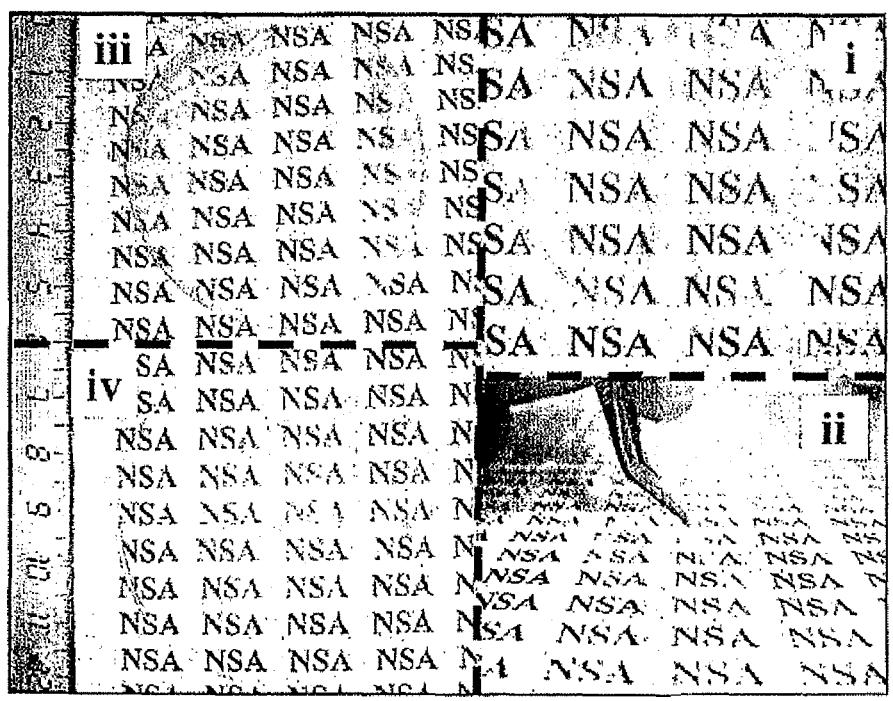
FIG. 7 represents the photographs of hybrid membranes in accordance with the invention, the latter having been placed on a printed backing; in this figure, the photographs (i) and (ii) are those of the membrane D of table 2 of example 2 described below, 40% by weight composed of precursor (1), the photograph (iii) is that of the membrane F of table 2 of example 2 described below, 58% by weight composed of precursor (1), and the photograph (iv) is that of the membrane E of table 2 of example 2 described below, 48% by weight composed of compound (1)

The appended FIG. 7 shows photographs of the hybrid materials D (FIGS. 7i and 7ii), F (FIG. 7iii) and E (FIG. 7iv), these having been placed on a printed backing.

Figure 8:
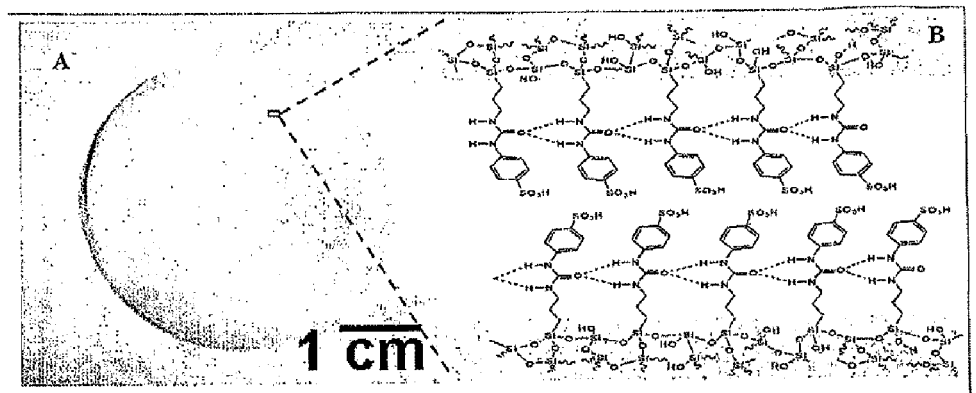
FIG. 8 shows a photo of the material H composed solely of the precursor (1) polymerized by the sol-gel method (FIG. 8A), and also a diagrammatic representation (FIG. 8B) of a proton channel existing within the lamellar structure of such a hybrid material.

FIG. 8 shows a photo of the material H composed solely of the precursor (1) (FIG. 8A) and also a diagrammatic representation (FIG. 8B) of a proton channel existing within the hybrid matrix of such a material, which then reveals a lamellar structure. For this type of structure, composed of successive planes, it is possible to define that the inorganic backbone (Si—O—Si)$_n$ forms the walls of the conduction channels, while the inside of the channels is formed by the grouping together of the organic parts and more particularly of the sulfonate functional groups.

Figure 9:
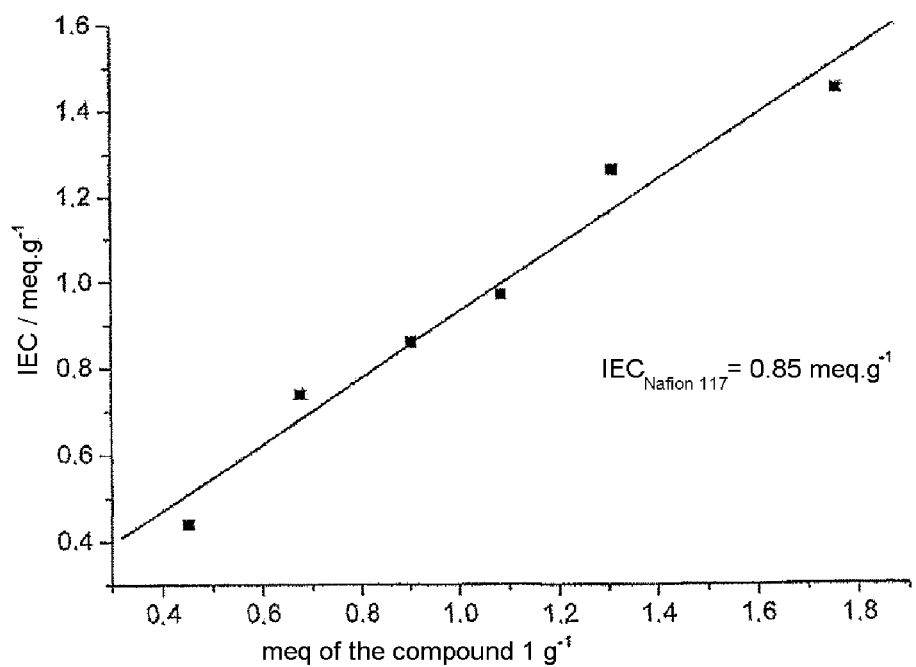
FIG. 9 represents the ion exchange capacity (IEC) of the membranes A to H at ambient temperature as a function of the meq of the compound (3) per gram of membrane.

It is observed, in FIG. 9, that the Ion Exchange Capacity (IEC) of the measured membranes B to H are very close to the theoretical values calculated from the molar amounts (in meq·g$^{-1}$) of the compound (3), which means that the protons of the sulfonate groups are accessible during the titration and participate in the proton conduction process.

Figure 10:
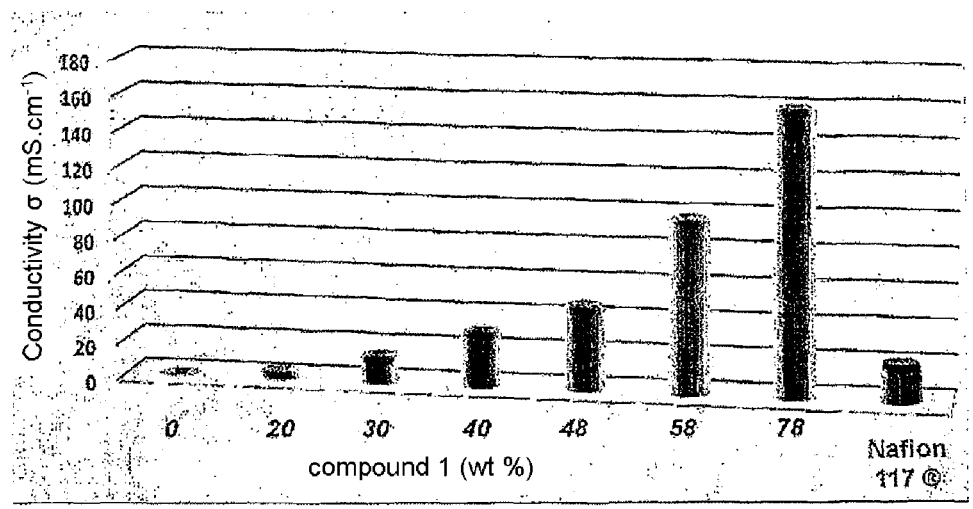
FIG. 10 represents the proton conductivity at 25° C. and 100% relative humidity of the membranes A to H and of the reference membrane of Nafion® 117 type.

FIG. 10 shows that the membrane D comprising only 40% by weight of the compound (1) achieves a greater proton conductivity than that of Nafion® 117, for an equal Ion Exchange Capacity (IEC) and a higher degree of swelling. The superiority of the proton conductivities measured for the membranes D to H can be attributed to the increase in the number of nanodomains having a high concentration of sulfonate groups (J. Power Sources, 2006, 154, 115-123).

Figure 11:
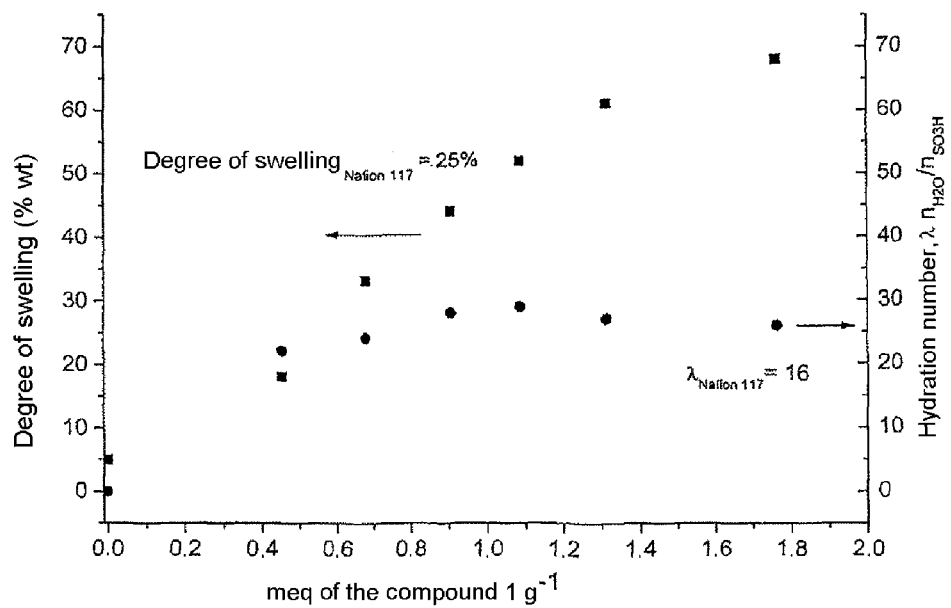
FIG. 11 represents the degree of swelling and the hydration number of the membranes A to H at ambient temperature as a function of the meq of the compound (3) per gram of membrane.

FIG. 11 demonstrates a linear increase in the degree of swelling of the membranes B to H, while the hydration number λ remains constant.

Figure 12:
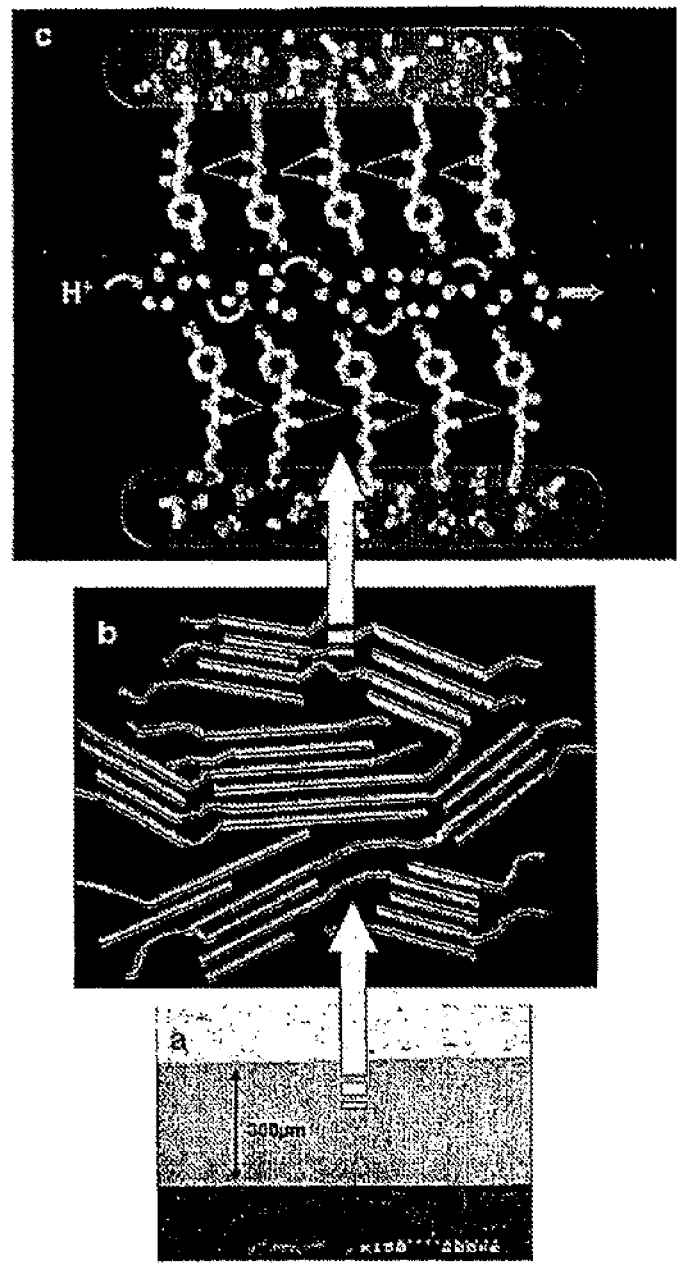
FIG. 12 gives a diagrammatic representation of the mechanism of formation of the hybrid membranes of the invention.

These data are confirmed by FIG. 12, which shows the formation of the channels. While the degree of swelling increases continually with the Ion Exchange Capacity (IEC), a more pronounced increase in the conductivity with the Ion Exchange Capacity (IEC) is recorded for the membranes E to H in comparison with the membranes B to D. For the membranes E to H, the high concentration of compound (1) extends the density and the orientation of the sulfonate groups, thus resulting in a highly concentrated conducting network of high proton conductivity. The proton conductivity of the PEM (Polymer Electrolyte Membrane) membranes is a key parameter which is strongly dependent on the Ion Exchange Capacity (IEC) and on the temperature, the activation energy Ea of which gives a general idea of the transportation mechanism. One of the disadvantages of Nafion® 117 is that it is difficult to apply to DMFC (Direct Methanol Fuel Cells) membranes, the permeability of the methanol being directly related to the structure of Nafion® 117, the ion conduction domains of which contribute to the rapid diffusion of the methanol (J. Power Sources, 2008, 175, 256-260).

The membrane I exhibits a conductivity $\sigma$=25 mS·cm$^{-1}$ virtually the same as the conductivity of Nafion® 117 ($\sigma$=22.4 mS·cm$^{-1}$, determined experimentally). The permeability to methanol of the membrane I ($P_M$=4.1×10$^{-7}$ cm$^2$/s at 25° C.) is reduced by 23% with respect to the permeability to methanol of Nafion® 117 ($P_M$=18.1×10$^{-7}$ cm$^2$/s at 25° C.). Ideally, a DMFC (Direct Methanol Fuel Cells) membrane should exhibit a high proton conductivity and a low permeability to methanol, the selectivity of the membrane for proton transportation in methanol being equal to $\beta=\sigma/P_M$. For the membrane I: $\beta$=61×10$^{-6}$ mS·s·cm$^{-1}$, this selectivity being approximately ten times greater than that of Nafion® 117.

This increase is due to the reduction in the permeability to methanol, since the membrane I and the Nafion® 117 exhibit the same proton conductivity.

The activation energy Ea is determined according to the Arrhenius law:

$$\sigma = \sigma_0 \exp(-Ea/RT)$$

where:
Ea is the Arrhenius activation energy,
T is the temperature, and
R is the perfect gas constant (usual value: R 8.314 J·mol$^{-1}$·K$^{-1}$).

As is shown in FIG. 13, the values obtained are approximately:

for the membrane I: Ea=17.46 kJ·mol$^{-1}$,
for Nafion® 117: Ea=13.32 kJ·mol$^{-1}$.

The value of the activation energy Ea obtained for the membrane I in comparison with that of Nafion® 117 suggests the presence of a more compact superstructure for the membrane I in which the water molecules (and also the methanol molecules) are less mobile (with respect to the structure of Nafion® 117).

What is claimed is:

1. A hybrid polymer material, characterized in that it is provided in the form of a film and in that it results from the sol-gel polymerization by nucleophilic catalysis of at least one hybrid precursor of following formula (I):

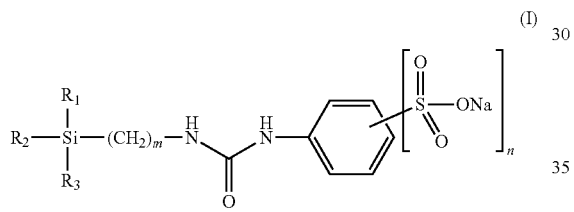

in which:
R$_1$ and R$_3$ are identical and represent a methyloxy or ethyloxy radical;
R$_2$ represents a methyl, ethyl, methyloxy, ethyloxy or phenyl radical;
m is an integer varying from 2 to 6 inclusive;
n is an integer equal to 1 or 2;
and of at least one plasticizing precursor of following formula (II):

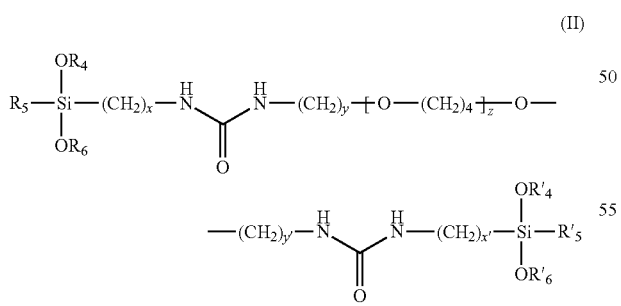

in which:
R$_4$, R'$_4$, R$_6$ and R'$_6$ are identical and represent a methyl or ethyl radical;
R$_5$ and R'$_5$, which are identical or different, represent a methyl, ethyl, methyloxy, ethyloxy or phenyl radical;
x and x', and y and y', which are identical or different, are integers varying from 2 to 6 inclusive;
z is an integer varying from 8 to 16 inclusive.

2. The material as claimed in claim 1, characterized in that the precursors of formula (II) are chosen from the compounds in which R$_4$, R'$_4$, R$_6$ and R'$_6$ represent an ethyl radical.

3. The material as claimed in claim 1, characterized in that the precursors of formula (II) are chosen from the compounds in which the R$_5$ and R'$_5$ radicals represent an ethyloxy radical.

4. The material as claimed in claim 1, characterized in that the precursors of formula (II) are chosen from the compounds in which x=x'=y=y'=3.

5. The material as claimed in claim 1, characterized in that, in the plasticizing precursors of formula (II), z is an integer varying from 12 to 14 inclusive.

6. The material as claimed in claim 1, characterized in that the precursor of formula (II) is bis(3-(triethoxysilyl)propylurea)-3-poly(tetrahydrofuran) in which the number (z) of tetrahydrofuran units=13.

7. The material as claimed in claim 1, characterized in that said plasticizing precursor represents from 10 to 40 mol %, with respect to the number of moles of precursor of formula (I).

8. A process for the preparation of a hybrid polymer material which is provided in the form of a film and which is as defined in any one of the preceding claims, characterized in that it comprises the following stages:
1) dissolution, in an anhydrous solvent, of at least one hybrid precursor of following formula (I):

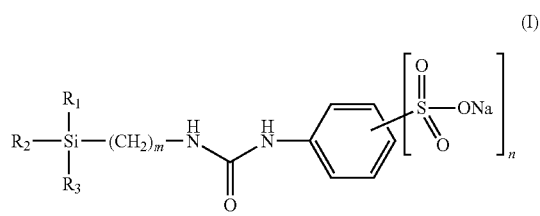

in which:
R$_1$ and R$_3$ are identical and represent a methyloxy or ethyloxy radical;
R$_2$ represents a methyl, ethyl, methyloxy, ethyloxy or phenyl radical;
m is an integer varying from 2 to 6 inclusive;
n is an integer equal to 1 or 2,
2) sol-gel polymerization of said hybrid precursor of formula (I) by addition of a nucleophilic catalyst chosen from primary amines and imidazole derivatives, in the presence of water, in order to obtain a gel,
3) shaping of said gel,
4) drying of said gel, in order to obtain a solid material in the form of a film,
5) Na$^+$/H$^+$ ion exchange by immersion of said film in an acid solution and
6) rinsing of said film with water in order to remove any trace of acid.

9. The process as claimed in claim 8, characterized in that the anhydrous solvent used during stage 1) is chosen from methanol, dimethylformamide and dimethylacetamide.

10. The process as claimed in claim 8, characterized in that the solution of the hybrid precursor or precursors of formula (I) of stage 1) additionally includes at least one plasticizing precursor of formula (II)

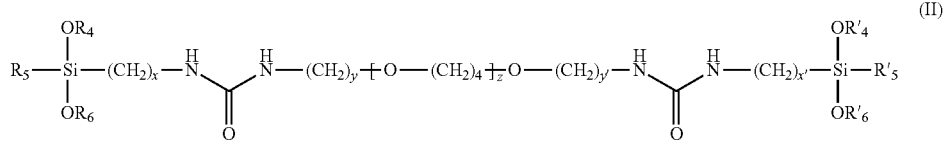

in which:
R$_4$, R'$_4$, R$_6$ and R'$_6$ are identical and represent a methyl or ethyl radical;
R$_5$ and R'$_5$, which are identical or different, represent a methyl, ethyl, methyloxy, ethyloxy or phenyl radical;
x and x', and y and y', which are identical or different, are integers varying from 2 to 6 inclusive;
z is an integer varying from 8 to 16 inclusive.

11. The process as claimed in claim 8, characterized in that the nucleophilic catalyst is benzylamine.

12. The process as claimed in claim 8, characterized in that the amount of nucleophilic catalyst used during stage 2) varies from 2 to 3 equivalents with respect to the total number of silicon which are present in the reaction medium and in that the amount of water is between 4 and 6 equivalents with respect to the total silicon number.

13. The process as claimed in claim 8, characterized in that stage 2) is carried out at ambient temperature.

14. The process as claimed in claim 8, characterized in that the ion exchange of stage 5) is carried out by immersion of the gel in a hydrochloric acid solution with a molarity of between 1 and 4M inclusive.

* * * * *